United States Patent
Nishida et al.

(10) Patent No.: US 11,038,215 B2
(45) Date of Patent: Jun. 15, 2021

(54) ELECTRONIC APPARATUS AND CONTROL METHOD THEREOF

(71) Applicants: Tetsu Nishida, Tokyo (JP); Takatoshi Itagaki, Tokyo (JP); Noriyuki Wainai, Tokyo (JP); Yasuhiro Kinoshita, Tokyo (JP)

(72) Inventors: Tetsu Nishida, Tokyo (JP); Takatoshi Itagaki, Tokyo (JP); Noriyuki Wainai, Tokyo (JP); Yasuhiro Kinoshita, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 113 days.

(21) Appl. No.: 16/559,892

(22) Filed: Sep. 4, 2019

(65) Prior Publication Data

US 2020/0136200 A1    Apr. 30, 2020

(30) Foreign Application Priority Data

Oct. 30, 2018  (JP) .................. 2018-204352

(51) Int. Cl.
*H01M 10/48*    (2006.01)
*H01M 10/0525*    (2010.01)

(52) U.S. Cl.
CPC ....... *H01M 10/48* (2013.01); *H01M 10/0525* (2013.01)

(58) Field of Classification Search
USPC ........ 324/426, 427, 430, 432, 433, 128, 162
See application file for complete search history.

(56) References Cited

U.S. PATENT DOCUMENTS

| | | | | |
|---|---|---|---|---|
| 2005/0237024 | A1* | 10/2005 | Hogari | G01R 31/3828 320/128 |
| 2013/0099794 | A1* | 4/2013 | Takahashi | H01M 10/48 324/427 |
| 2014/0021919 | A1* | 1/2014 | Ishishita | H02J 7/007 320/109 |
| 2015/0132621 | A1 | 5/2015 | Henrici et al. | |
| 2015/0160302 | A1 | 6/2015 | Xu et al. | |

FOREIGN PATENT DOCUMENTS

JP    2014-120335    6/2014

OTHER PUBLICATIONS

Extended European search report for European Patent Application No. 19196973.2 dated Mar. 27, 2020.

* cited by examiner

*Primary Examiner* — Vincent Q Nguyen
(74) *Attorney, Agent, or Firm* — IPUSA, PLLC

(57) ABSTRACT

An electronic apparatus includes a secondary battery, a deformation amount detector configured to detect a deformation amount of the secondary battery, a full charge detector configured to detect a full charge of the secondary battery, a stable state detector configured to detect a stable state after a full charge is detected by the full charge detector, and a state determination unit configured to determine a state of the secondary battery using the deformation amount detected by the deformation amount detector when the stable state is detected by the stable state detector.

6 Claims, 7 Drawing Sheets

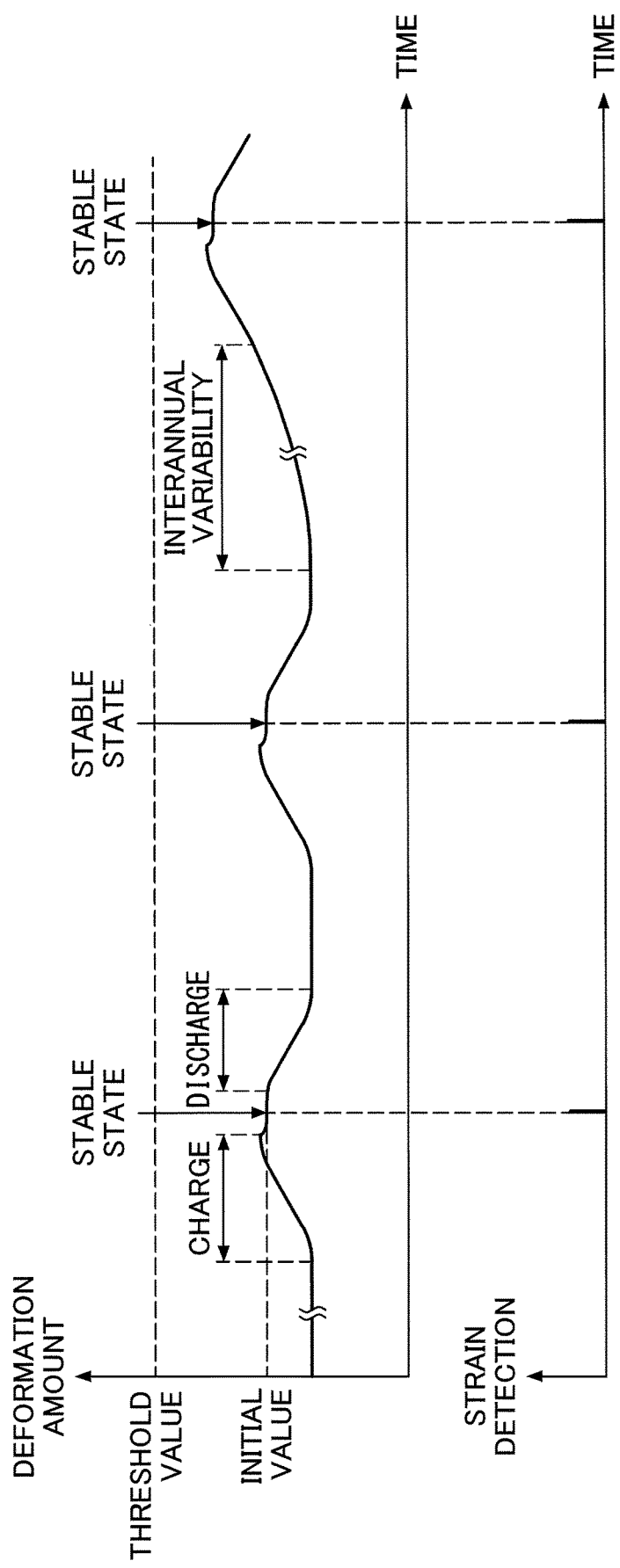

ELECTRONIC APPARATUS AND CONTROL METHOD THEREOF

CROSS-REFERENCE TO RELATED APPLICATIONS

This application is based on and claims priority to Japanese Patent Application No. 2018-204352, filed Oct. 30, 2018. The entire contents of Japanese Patent Application No. 2018-204352 are hereby incorporated by reference.

BACKGROUND OF THE INVENTION

1. Field of the Invention

The present invention relates to an electronic apparatus and a control method thereof.

2. Description of the Related Art

A lithium ion battery, which is one example of a secondary battery, is widely used in electronic apparatuses such as smartphones, but are known to degrade due to repeated charges and discharges. In particular, a lithium ion battery may expand due to an expansion of internal layered body due to repeated charging and discharging, or due to internal pressure increase due to electrolyte vaporization caused by a rise of internal temperature. If these lithium-ion batteries remain to be degraded, there is a risk of ignition and explosion.

Accordingly, it has been proposed to provide a pressure sensor for detecting the pressure caused by the expansion of a lithium ion battery and monitor the presence or absence of deformation of a lithium ion battery based on the output signal of the pressure sensor (see, for example, Patent Document 1).

[Patent Document 1] Japanese Patent No. 5881593

As described in Patent Document 1, the deformation amount of a lithium ion cell does not increase monotonically over time, but increases during charging and decreases during discharge. Accordingly, with repeated charging and discharging of lithium ion batteries, the deformation amount increases as a whole over time, with repeated increases and decreases associated with charging and discharging.

Therefore, because the deformation amount of the lithium ion battery increases or decreases due to charge and discharge, the error depending on the detection timing of the deformation amount is large, and it may not be possible to accurately determine the state of the lithium ion battery.

An object of the present invention is to enable accurate determination of the state of the lithium ion battery.

SUMMARY OF THE INVENTION

An electronic apparatus includes a secondary battery, a deformation amount detector configured to detect a deformation amount of the secondary battery, a full charge detector configured to detect a full charge of the secondary battery, a stable state detector configured to detect a stable state after a full charge is detected by the full charge detector, and a state determination unit configured to determine a state of the secondary battery using the deformation amount detected by the deformation amount detector when the stable state is detected by the stable state detector.

BRIEF DESCRIPTION OF DRAWINGS

FIG. 7 is a graph illustrating time variation of deformation amount and strain detection timing of the lithium ion battery deformation amount.

DETAILED DESCRIPTION OF EMBODIMENTS

Figure 1:
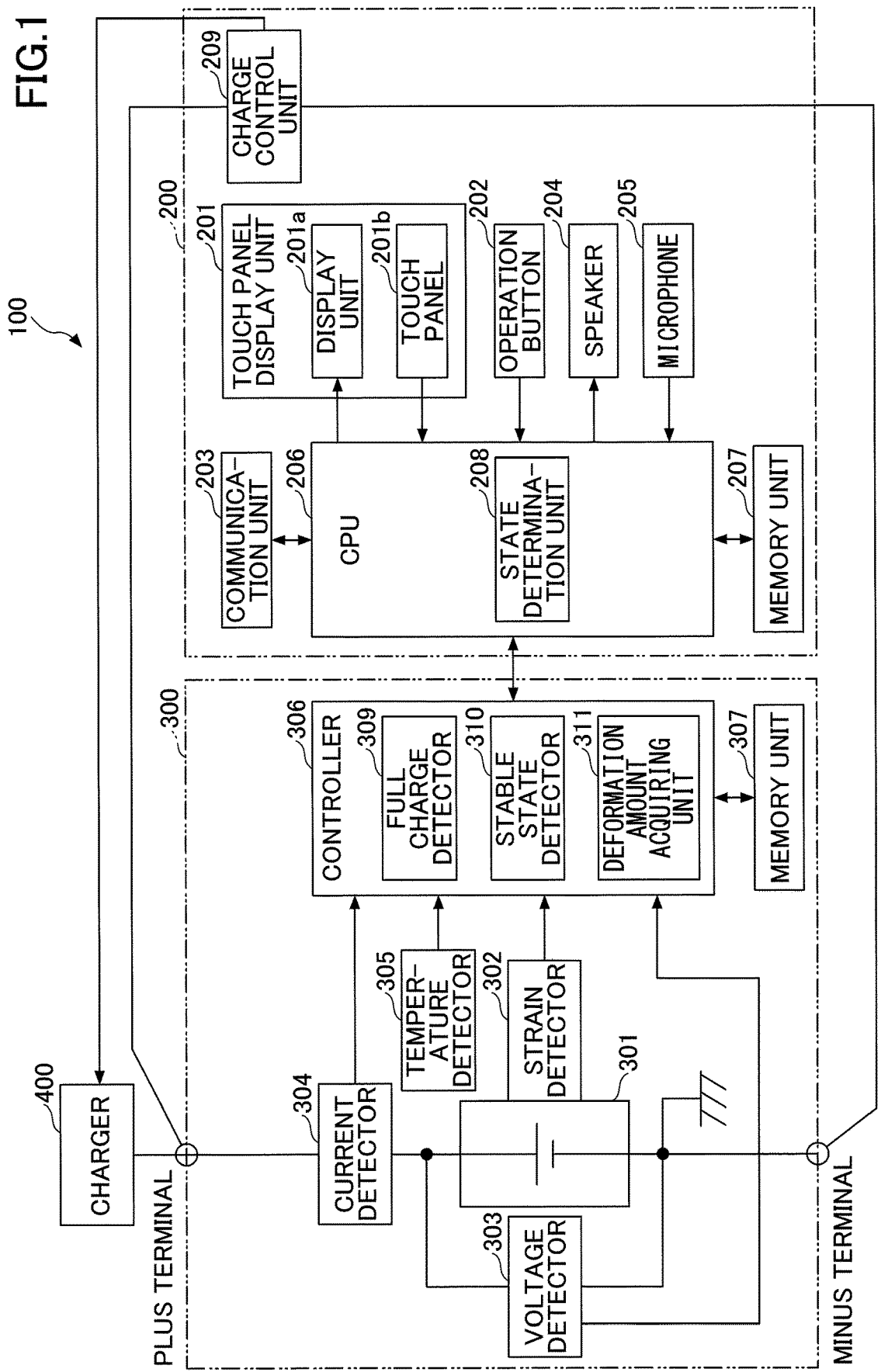
FIG. 1 is a block diagram illustrating a schematic configuration of an electronic apparatus according to a first embodiment.

Hereinafter, an embodiment of carrying out the invention with reference to the drawings will be described. In each figure, the same components are indicated by the same reference numerals and overlapping descriptions may be omitted.

In the embodiments described below, a smartphone is exemplified as an example of the electronic apparatus to which the present invention is applied.

First Embodiment

Hereinafter, the electronic apparatus according to the first embodiment of the present invention will be described.
[Outline of Electronic Apparatus]

FIG. 1 is a diagram illustrating a schematic configuration of the electronic apparatus 100 according to the first embodiment.

In FIG. 1, the electronic apparatus 100 includes a main unit 200 and a battery unit 300 as a battery module. A charger 400 is connected to the battery unit 300.

The main unit 200 includes a touch panel display unit 201, an operation button 202, a communication unit 203, a speaker 204, a microphone 205, a CPU (Central Processing Unit) 206, a memory unit 207, and a charge control unit 209.

The touch panel display unit 201 includes a display unit 201a and a touch panel 201b. The touch panel 201b is laminated on the display unit 201a.

The display unit 201a is a display device such as a liquid crystal display or an organic EL display.

The touch panel 201b detects the user's fingers or the like touching the surface and the touched position and transmits a detection signal to the CPU 206. The detection method of the touch panel 201b may be any of a capacitance method, a resistive film method, a surface acoustic wave method, an infrared method, a load detection method, and the like.

The operation button 202 is a power button, a volume button, or the like that accepts an operation input from a user.

The communication unit 203 is, for example, a wireless communication module that performs wireless communication. The communication unit 203 supports communication standards such as 2G, 3G, 4G, and 5G or near-range radio communication standards.

The speaker 204 outputs a sound signal sent from the CPU 206 as a sound. The speaker 204 outputs, for example, the voice of a movie played in electronic apparatus 100, music, and the voice of the other party during a call. The microphone 205 converts the input user's voice or the like into a sound signal and transmits it to the CPU 206.

The CPU 206 is a main controller that controls each portion of the main unit 200 and the battery unit 300. The CPU 206 executes the instruction included in the program stored in the memory unit 207 while referring to the data stored in the memory unit 207 as necessary. The CPU 206 implements various functions based on data and instructions.

The memory unit 207 includes a memory such as a RAM (Random Access Memory) or a flash memory. The memory unit 207 stores various types of data such as setting data, detection data, and programs.

The charge control unit 209 is connected to a plus terminal and a minus terminal of the battery unit 300 and charges the lithium ion battery 301 by controlling the charger 400 based on the voltage and current of the battery unit 300.

The battery unit 300 includes a lithium ion battery 301, a strain detector 302 as a deformation amount detector, a voltage detector 303, a current detector 304, a temperature detector 305, a controller 306, and a memory unit 307.

A lithium ion battery 301 is a set of batteries to which a plurality of cell is connected, or a secondary battery composed of a single cell. The lithium ion battery 301 supplies power to each portion of the battery unit 300 and to the main unit 200. That is, the main unit 200 is a load apparatus for the lithium ion battery 301.

The strain detector 302 is a sensor that detects the deformation amount of the lithium ion battery 301. A strain gauge for detecting, for example, strain occurring on a measurement object as a change in an electrical resistance value is used as the strain detector 302. The resistance change of the strain detector is detected, for example, by converting to a voltage using a Wheatstone bridge circuit.

Figure 2:
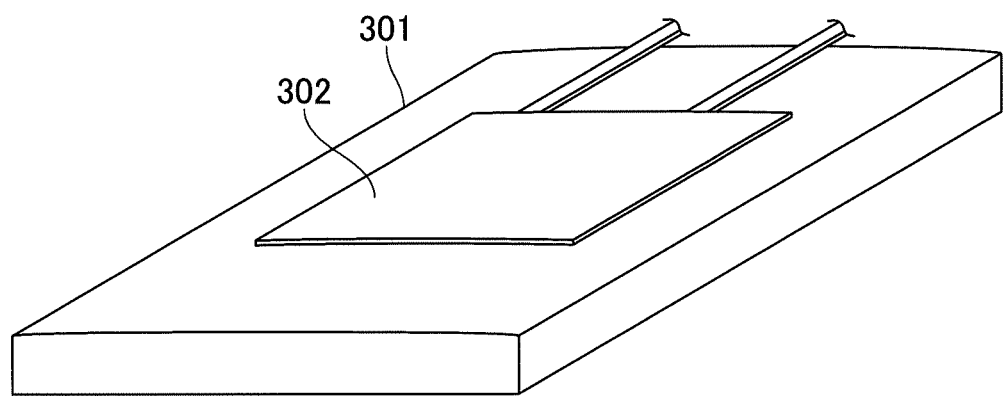
FIG. 2 illustrates a lithium ion battery to which a strain detector is attached.

The strain detector 302 is attached to the lithium ion battery 301 by a bond or the like. For example, as illustrated in FIG. 2, if the lithium ion battery 301 is like a flat plate, the strain detector 302 is attached to the front surface of the lithium ion battery 301.

The strain detector 302 is not limited to the strain gauge and may be a pressure sensor.

Returning to FIG. 1, the voltage detector 303 detects the voltage between terminals of the lithium ion battery 301 and outputs the voltage detection value to the controller 306.

A current detector 304 is provided, for example, in the charging path between the lithium ion battery 301 and the charger 400. The current detector 304 has a detection resistance and detects a charging current and a discharging current to output a current detection value to the controller 306.

The controller 306 controls each part of the battery unit 300. The controller 306 executes the instructions included in the program stored in the memory unit 307 while referring to the data stored in the memory unit 307 as necessary. The controller 306 implements various functions based on data and instructions.

The temperature detector 305 is a temperature sensor for detecting the temperature of the lithium ion battery 301 or its surrounding, and outputs the temperature detection value to the controller 306.

The memory unit 307 includes a memory such as a RAM or a flash memory. The memory unit 307 stores various types of data such as setting data, detection data, etc., and programs.

[Functional Structure of Electronic Apparatus]

Next, the functional structure implemented by the CPU 206 and the controller 306 will be described.

The controller 306 includes, for example, a full charge detector 309, a stable state detector 310, and a deformation amount acquiring unit 311.

The full charge detector 309 detects that the lithium ion battery 301 is fully charged based on the voltage detection value detected by the voltage detector 303 and the current detection value detected by the current detector 304 while charging the lithium ion battery 301.

Figure 4:
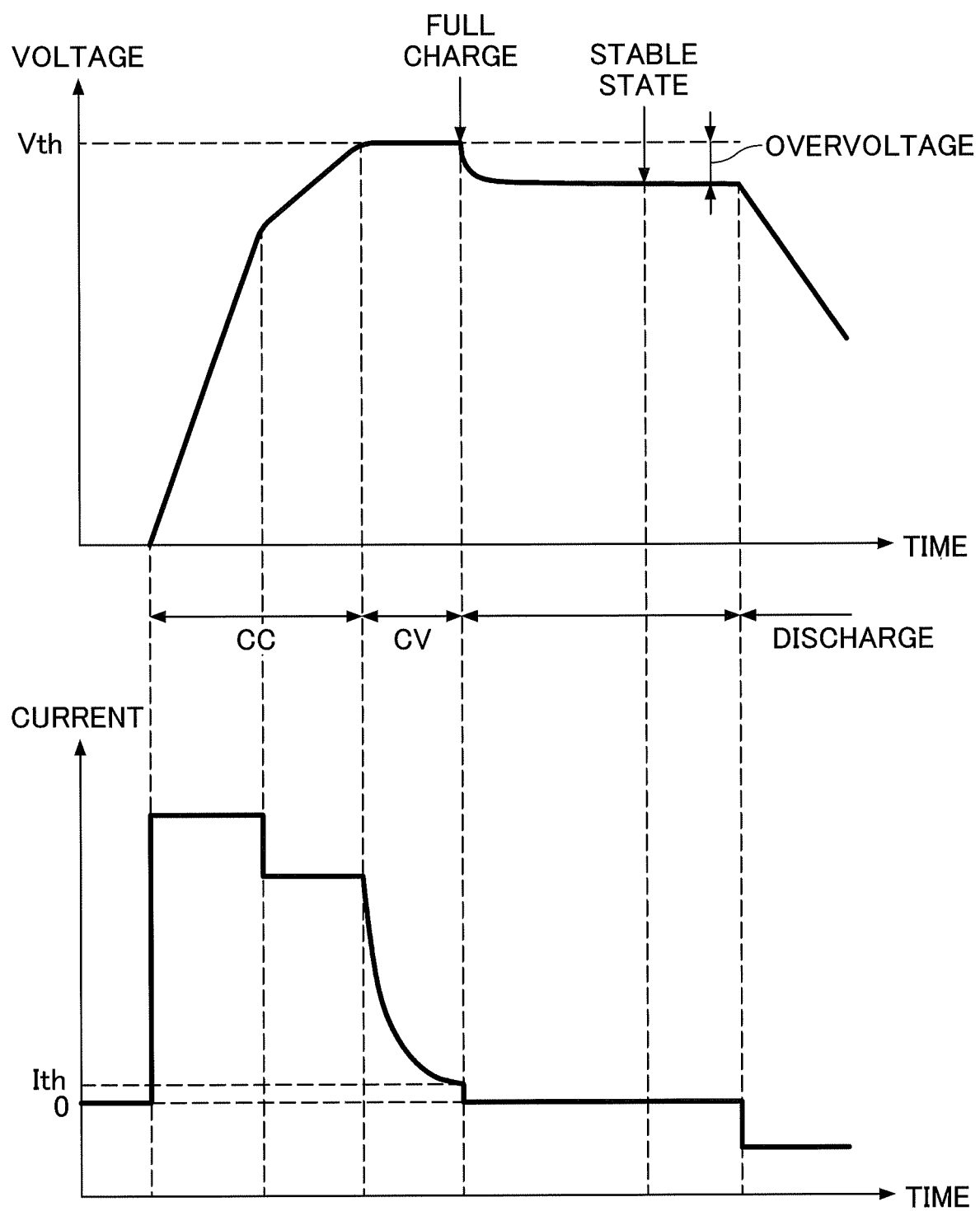
FIG. 4 is a graph illustrating charging characteristics of a lithium ion battery.

In the lithium ion battery 301, after charging is stopped due to full charge, the output voltage is stabilized by a continuous load state of an no-load or micro-discharge state (see FIG. 4). The difference (V1−V2) between the output voltage immediately after full charge (a charge voltage V1) and the output voltage (an open end voltage V2) when the no-load or micro-discharge load condition continues to be almost constant is called overvoltage.

After the lithium ion battery 301 is fully charged, the stable state detector 310 detects a stabilized state (a stable state) based on the voltage detection value detected by the voltage detector 303 and the current detection value detected by the current detector 304.

The deformation amount acquiring unit 311 acquires the deformation amount of the lithium ion battery 301 from the strain detector 302. When the deformation amount is acquired, the deformation amount acquiring unit 311 records the acquired deformation amount (acquisition data) in the memory unit 307. When receiving the request command of the deformation amount (acquisition data) from the CPU 206, the controller 306 transmits the deformation amount (acquisition data) recorded in the memory unit 307 to the CPU 206.

The CPU 206 includes, for example, a state determination unit 208.

The state determination unit 208 determines the state of the lithium ion battery 301 based on the deformation amount of the lithium ion battery 301 detected by the strain detector 302 when a stable state is detected by the stable state detector 310.

For example, when a stable state is detected by the stable state detector 310, the state determination unit 208 gives an instruction to the deformation amount acquiring unit 311 of the controller 306, receives the acquisition data of the deformation amount acquired by the deformation amount acquiring unit 311, and records the data in the memory unit 207. Each time the lithium ion battery 301 is charged, the memory unit 207 records the data for acquiring the deformation amount acquired in the stable state.

For example, when the deformation amount of the lithium ion battery 301 is equal to or greater than a predetermined threshold value, the state determination unit 208 determines that the lithium ion battery 301 is in an abnormal state on the assumption that at least a certain degree of expansion has occurred.

When the state determination unit 208 determines the abnormal state, the state determination unit 208 notifies the user of a message representing that the lithium ion battery 301 is in an abnormal state using the display unit 201a or the speaker 204.

The lithium ion battery 301 possibly undergoes deformation in an early stage when the electronic apparatus 100 is manufactured. In addition, there are individual variations and mounting variations in the deformation amount of the lithium ion battery 301. For this reason, it is preferable that the state determination unit 208 records one deformation amount detected by the strain detector 302 in the stable state before shipment, such as an inspection process at the time of manufacturing the electronic apparatus 100, as the initial value in the memory unit 207, and determines the threshold value used for the state determination based on the initial value.

Because the deformation amount is recorded in the memory unit 207 as time-series data corresponding to the detection time of the deformation amount, the state determination unit 208 may perform an abnormality determination based on a time variation rate of the deformation amount in addition to the determination based on the size of the deformation amount.

In the present embodiment, when the deformation amount of the lithium ion battery 301 is acquired from the strain detector 302, the deformation amount acquiring unit 311 records the acquired deformation amount (acquisition data) in the memory unit 307. When the request command of requesting the deformation amount (acquisition data) is received from the CPU 206, the controller 306 transmits the deformation amount (acquisition data) recorded in the memory unit 307 to the CPU 206. The controller 306 may be configured to acquire the deformation amount of the lithium ion battery 301 detected by the strain detector 302 and transmit the acquisition data of the deformation amount to the state determination unit 208 of the CPU 206 regardless of the instruction of the CPU 206.

[Full Charge Detection Operation]

Next, a full charge detection operation by the full charge detector 309 will be described in more detail.

Figure 3:
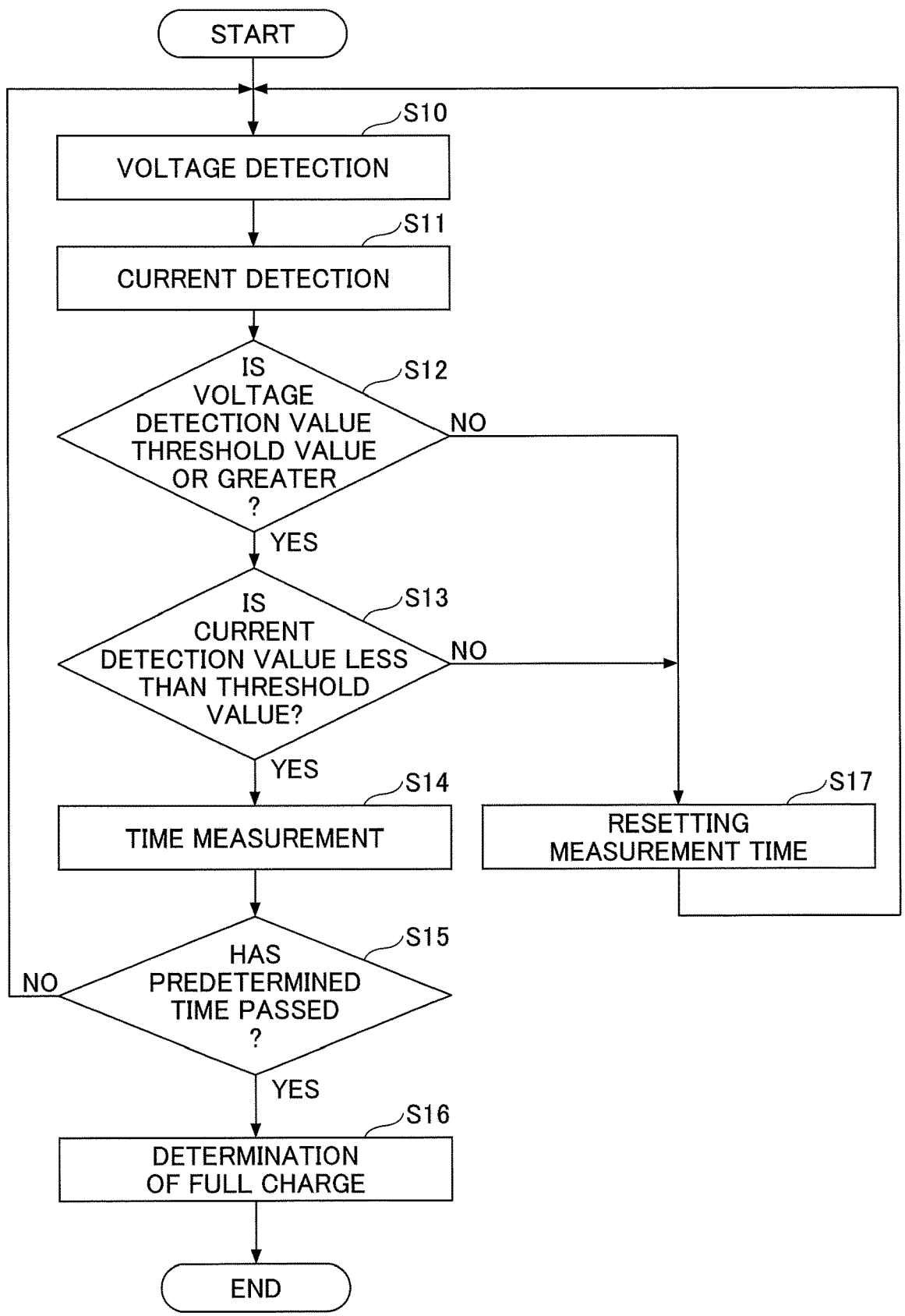
FIG. 3 is a flowchart illustrating a full charge detection operation.

FIG. 3 is a flowchart illustrating the full charge detection operation. FIG. 4 is a graph illustrating the charging characteristics of the lithium ion battery 301.

When the charging operation by the charge control unit 209 starts, the full charge detector 309 acquires the voltage detection value detected by the voltage detector 303 (step S10) and acquires the current detection value detected by the current detector 304 (step S11) as illustrated in FIG. 3.

In step S12, the full charge detector 309 determines whether the acquired voltage detection value is equal to or greater than the predetermined threshold value Vth. In step S13, when the voltage detection value is equal to or greater than the threshold value Vth (YES in step S12), the full charge detector 309 determines whether the current detection value is less than the predetermined threshold value Ith.

When the current detection value is less than the threshold value Ith (YES in step S13), the full charge detector 309 performs time measurement (step S14) and determines whether a certain time has passed (step S15). When a certain time has not passed (NO in step S15), the full charge detector 309 returns the process to step S10.

When the voltage detection value is not equal to or greater than the threshold value Vth (NO in step S12) and when the current detection value is not less than the threshold value Ith (NO in step S13), the full charge detector 309 resets the measurement time (NO in step S17) and returns the process to step S10.

In step S16, the full charge detector 309 determines that the charge is reached when a certain period of time passes (YES in step S15), that is, when the voltage is at the threshold value Vth and a state where the current is less than the threshold value Ith continues for a predetermined time. Here, the predetermined time is, for example, a time selected from the range of 10 seconds to 1 minute.

The detection sequence and the determination sequence of steps S10 to S13 are not limited thereto, and can be appropriately changed.

[Stable State Detection Operation]

Figure 5:
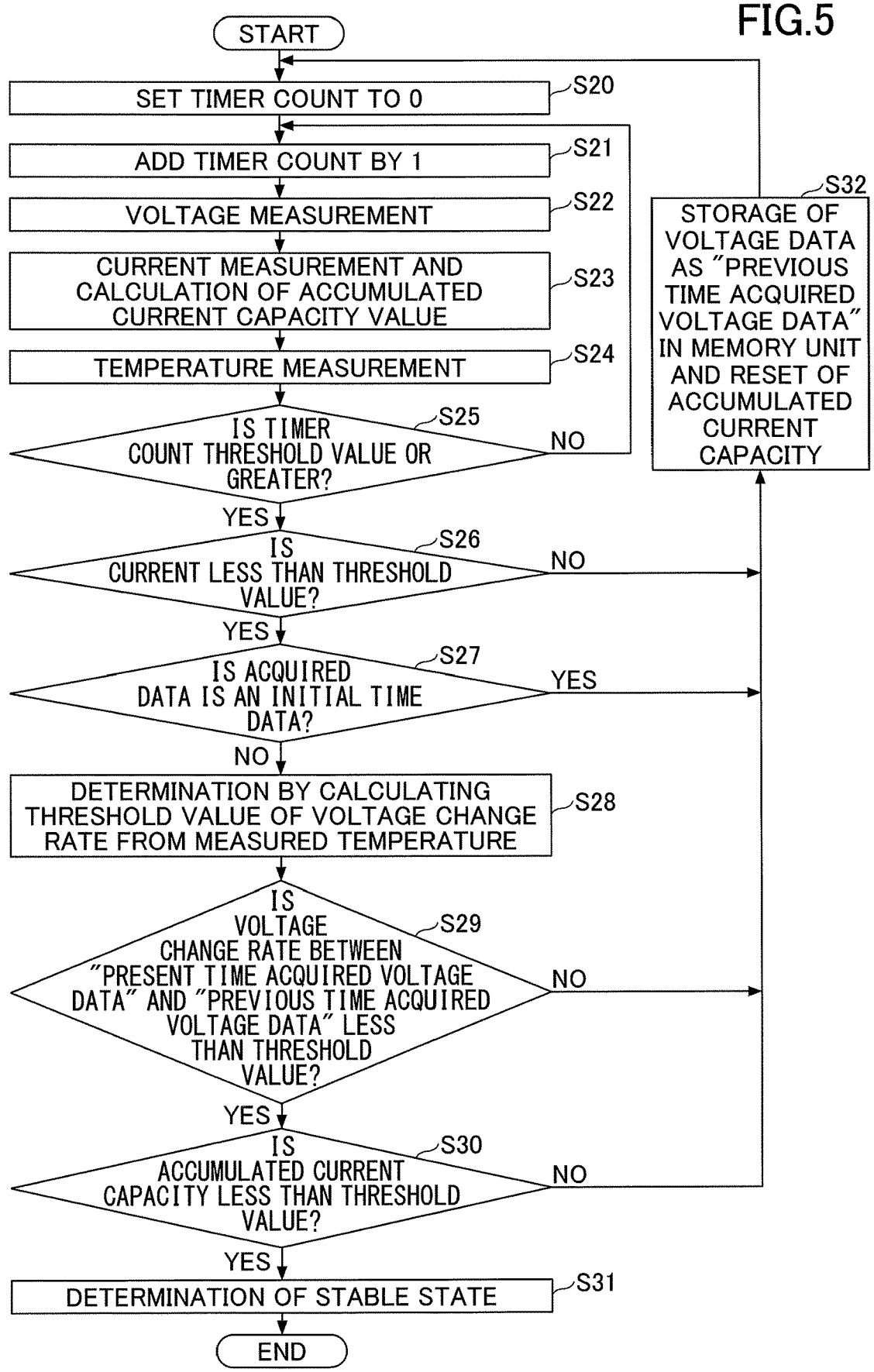
FIG. 5 is a flowchart illustrating a stable state detection operation.

Next, the stable state detection operation by the stable state detector 310 will be described in more detail. FIG. 5 is a flowchart illustrating a stable state detection operation.

When a full charge is detected by the full charge detector 309, the stable state detector 310 starts an operation, sets the count (timer count (not illustrated) of the timer included in the controller 306 to 0 (zero) (step S20), and transfers the processing to step S21.

In step S21, 1 is added to the timer count and the process is transferred to step 22.

In step S22, the voltage value measured by the voltage detector 303 is acquired, and the process is transferred to step 23. In step S23, the current value measured by the current detector 304 is acquired, the accumulated current value is calculated, and the process is transferred to step 24.

In step 24, the temperature measured by the temperature detector 305 is acquired and the process is transferred to step S25.

In step S25, the stable state detector 310 determines whether the timer count is above the threshold value, and when it is determined that the timer count is not above the threshold value (determination of NO), returns the processing to step S21. Meanwhile, when it is determined that the stable state detector 310 is the timer count (determination of YES), the processing is transferred to step S26.

In step S26, the stable state detector 310 determines whether the measured current value measured by the current detector 304 is less than the threshold value, and if it is determined that the measured current value is not less than the threshold value (determination of NO), transfers the process to step S32. In step S32, the voltage data acquired in step S22 is stored in the memory unit 307 as the previously acquired voltage data, the accumulated current capacity is reset, and the process returns to step S20. Meanwhile, in step S26, when it is determined that the measured current value is less than the threshold value (determination of YES), the stable state detector 310 moves to the process of step S27.

In step S27, the stable state detector 310 determines whether the voltage data acquired in step S22 is the first data after the stabilization detection operation is started. When it is determined that the voltage data is the first data (determination of YES), the process is transferred to step S32. Meanwhile, when it is determined that the stable state detector 310 is not the first data (determination of NO), the process is transferred to step S28.

In step S28, the stable state detector 310 calculates and determines the threshold value of the voltage change rate from the measurement temperature measured in step S24, and transfers the process to step S29.

In step S29, the stable state detector 310 calculates the voltage change rate from the previously acquired voltage data stored in the memory unit 307 and the voltage change rate acquired this time, and compares the calculated voltage change rate with the threshold value of the voltage change rate determined in step S28. When it is determined that the voltage change rate is not less than the threshold value (determination of NO), the stable state detector 310 transfers the process to step S32. Meanwhile, when it is determined that the voltage change rate is less than the threshold value (determination of YES), the stable state detector 310 transfers the process to step S30.

In step S30, the stable state detector 310 determines whether the accumulated current capacity value calculated in step S23 is less than the threshold value. When it is determined that the accumulated current capacity value is not less than the threshold value (determination of NO), the process is transferred to step S32. Meanwhile, in step S31, when it is determined that the accumulated current flow capacity value is less than the threshold value (determination of YES), the stable state detector 310 determines that the electronic apparatus is in a stable state.

The detection sequence and the determination sequence of steps S20 to S32 are not limited thereto, and can be appropriately changed.

Further, it is possible to apply the residual capacitance meter of the secondary battery disclosed in Japanese Laid-Open Patent Application No. 2011-169817 or the like as the stable state detector 310. It is sufficient to detect the stable state based on the change rate of the residual capacity (charge rate).

[State Determination Operation of Lithium Ion Battery]

Next, a series of operations related to the state determination of the lithium ion battery 301 will be described in more detail.

Figure 6:
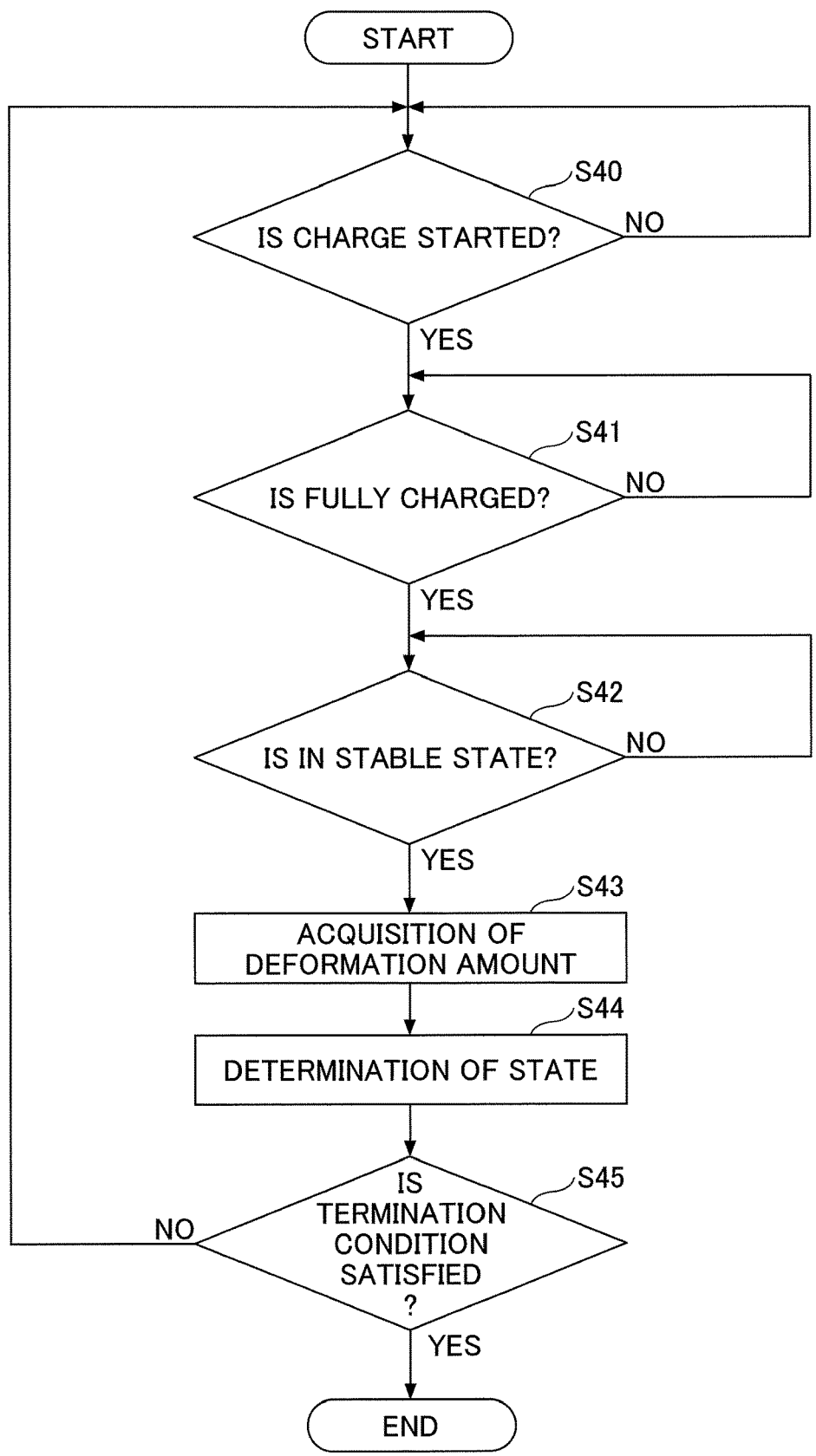
FIG. 6 is a flowchart illustrating a series of operations related to the state determination of the lithium ion battery.

FIG. 6 is a flowchart illustrating a series of operations for determining the state of the lithium ion battery 301.

In FIG. 6, in step S40, the CPU 206 determines whether the charging operation starts by the charge control unit 209. When the charging operation is started (YES in step S40), the full charging detection operation of full charge is performed by the full charge detector 309 (step S41).

When the full charge is detected by the full charge detector 309 (YES in step S41), the stable state detecting operation is performed by the stable state detector 310 (step S42).

In step S42, when the stable state is detected by the stable state detector 310 (YES), the state determination unit 208 acquires the deformation amount of the lithium ion battery 301 detected by the strain detector 302 through the deformation amount acquiring unit 311 (step S43) and performs a state determination of the lithium ion battery 301.

The CPU 206 determines whether the predetermined termination condition is satisfied (step S45), and ends the operation when the termination condition is satisfied (step S45: YES). On the other hand, when the termination condition is not satisfied (NO in step S45), the CPU 206 returns the processing to step S40.

[Time Variation of Deformation Amount]

FIG. 7 is a graph illustrating the time variation and strain detection timing of the deformation amount of the lithium ion battery 301.

The deformation amount of the lithium ion battery 301 tends to increase by charging and decrease by discharging because the internal stack expands upon charging.

Also, the average value of the deformation amount of the lithium ion battery 301 tends to increase by interannual variability. This is caused by the cycling deterioration of the charge and discharge of the lithium ion battery 301, the neglect of the electronic apparatus 100 at high temperatures, and the deformation of the lithium ion battery 301 due to dropping of the electronic apparatus 100.

Thus, the deformation amount of the lithium ion battery 301 increases as a whole over time, with repeated increases and decreases associated with charge and discharge.

In the electronic apparatus 100 according to the present embodiment, because the state is determined based on the deformation amount detected by the strain detector 302 in the stable state after the full charge, the influence of the increase or decrease of the deformation amount due to the charge and discharge is suppressed, and the state of the lithium ion battery 301 can be accurately determined.

It is possible that strain detection is performed when the lithium ion battery 301 is fully charged. However, because the temperature and the battery voltage vary during the period from after the full charge to the stable state, the deformation amount detected in the stable state is used as a cause of deformation of the lithium ion battery 301. Therefore, the accuracy of the state determination is improved.

In addition, because the threshold value is set based on the initial value in the state determination, it is possible to suppress the false determination based on the individual difference, the mounting variation, or the like of the lithium ion battery 301.

In the first embodiment, the strain detector 302 detects the strain only in the stable state. However, regardless of whether the strain detector 302 is in the stable state or not, the strain detector 302 periodically detects the deformation amount and records the deformation amount in the memory unit. The state determination unit 208 may be configured to acquire the deformation amount detected in the stable state from the memory unit based on the determination result of the stable state.

Accordingly, the electronic apparatus according to the present invention has features of determining the state of the lithium ion battery 301 based on the deformation amount of the lithium ion battery 301 detected when the battery is in the stable state based on the determination result of a stable state after the lithium ion battery 301 is fully charged.

Further, the deformation amount used for the state determination by the state determination unit 208 may not be acquired at the same time as when the stable state is detected by the stable state detector 310, but may be detected within a period in which the stable state can continue after the stable state is detected.

In the above embodiment, the controller 306 is provided inside the battery unit 300, but the controller 306 may be provided inside the main unit 200.

In the above embodiment, the CPU 206 and the controller 306 are separately provided, but these may be configured by a single arithmetic processing circuit.

In the above embodiment, the full charge detector 309, the stable state detector 310, and the deformation amount acquiring unit 311 are provided inside the controller 306. However, the full charge detector 309, the stable state detector 310, and the deformation amount acquiring unit 311 may be provided inside the CPU 206.

In the above embodiment, the state determination unit 208 notifies that the lithium ion battery 301 is in the abnormal state when it is determined that the lithium ion battery 301 is in the abnormal state. However, in addition to the above embodiment, or alternatively, when it is determined that the lithium ion battery 301 is in the abnormal state, the charge control unit 209 may be instructed to change the charging method or the charging condition.

In the above embodiment, the smartphone has been exemplified as the electronic apparatus. However, the present invention is not limited to the smartphone and can be applied to various electronic apparatuses.

According to the present invention, the state of a lithium ion battery can be accurately determined.

While the preferred embodiments of the invention have been described in detail above, the invention is not limited to the embodiments described above, and various modifications and substitutions can be made to the embodiments described above without departing from the scope of the invention.

EXPLANATION OF SYMBOLS

100 Electronic apparatus
200 Main unit
206 CPU
208 State determination unit
209 Charge control unit
300 Battery unit 301 Lithium ion battery
302 Strain detector (deformation amount detector)
303 Voltage detector
304 Current detector
305 Temperature detector
306 Controller
309 Full charge detector
310 Stable state detector
311 Deformation amount acquiring unit
400 Charger

What is claimed is:

1. An electronic apparatus comprising:
a secondary battery;
a deformation amount detector configured to detect a deformation amount of the secondary battery;
a full charge detector configured to detect a full charge of the secondary battery;
a stable state detector configured to detect a stable state after a full charge is detected by the full charge detector; and
a state determination unit configured to determine a state of the secondary battery using the deformation amount detected by the deformation amount detector when the stable state is detected by the stable state detector,
wherein the stable state detector determines that the electronic apparatus is in the stable state when a voltage change rate and an accumulated current capacity value after the full charge are respectively less than predetermined threshold values.

2. The electronic apparatus according to claim 1,
wherein the state determination unit determines an abnormal state when a value of the deformation amount exceeds a predetermined threshold value.

3. The electronic apparatus according to claim 2,
wherein the state determination unit records one of the deformation amounts detected by the deformation amount detector as an initial value when the stable state is detected, and determines the predetermined threshold value based on the initial value.

4. The electronic apparatus according to claim 2,
wherein the state determination unit determines the state based on a time variation rate of the deformation amount in addition to the value of the deformation amount.

5. The electronic apparatus according to claim 1,
wherein the deformation amount detector is a strain detector or a pressure sensor.

6. A control method for controlling an electronic apparatus, the electronic apparatus having a secondary battery and a deformation amount detector for detecting a deformation amount of the secondary battery, the control method comprising:
a full charge detection step of detecting a full charge of the secondary battery;
a stable state detection step of detecting a stable state after the full charge is detected; and
a state determination step of determining a state of the secondary battery using the deformation amount detected by the deformation amount detector when the stable state is detected,
wherein the stable state detection step further determines that the electronic apparatus is in the stable state when a voltage change rate and an accumulated current capacity value after the full charge are respectively less than predetermined threshold values.

* * * * *